US009758619B2

(12) United States Patent
Quintanilla et al.

(10) Patent No.: US 9,758,619 B2
(45) Date of Patent: Sep. 12, 2017

(54) PROCESS FOR MAKING POLYETHER ALCOHOLS HAVING OXYETHYLENE UNITS BY POLYMERIZATION OF ETHYLENE CARBONATE IN THE PRESENCE OF DOUBLE METAL CYANIDE CATALYSTS

(75) Inventors: Esther E. Quintanilla, Antwerpen (BE); Hanno R. Van Der Wal, Hoek (NL); Daniel C. Floyd, Richmond, VA (US); Myriam Linke, Terneuzen (NL); Francois M. Casati, Pfaffikon (CH); Carlos M. Villa, Lake Jackson, TX (US); Jean-Paul Masy, Destelbergen (BE); Ricco B. Borella, Shindellegi (CH); Paul Cookson, Samstagern (CH)

(73) Assignee: Dow Global Technologies LLC, Midland, MI (US)

( * ) Notice: Subject to any disclaimer, the term of this patent is extended or adjusted under 35 U.S.C. 154(b) by 128 days.

(21) Appl. No.: 14/234,577

(22) PCT Filed: Aug. 15, 2012

(86) PCT No.: PCT/US2012/050976
§ 371 (c)(1),
(2), (4) Date: Jan. 23, 2014

(87) PCT Pub. No.: WO2013/028437
PCT Pub. Date: Feb. 28, 2013

(65) Prior Publication Data
US 2014/0163197 A1     Jun. 12, 2014

Related U.S. Application Data

(60) Provisional application No. 61/527,299, filed on Aug. 25, 2011.

(51) Int. Cl.
*C08G 65/34*   (2006.01)
*C08G 65/00*   (2006.01)
*C08G 65/26*   (2006.01)

(52) U.S. Cl.
CPC ............. *C08G 65/34* (2013.01); *C08G 65/00* (2013.01); *C08G 65/2663* (2013.01)

(58) Field of Classification Search
CPC .................................................. C08G 65/2663
See application file for complete search history.

(56) References Cited

U.S. PATENT DOCUMENTS

| 2,945,025 | A | * | 7/1960 | De Groote | C07H 15/08 536/120 |
| 4,116,811 | A | * | 9/1978 | Schaefer | C10C 3/026 208/44 |
| 4,293,314 | A | * | 10/1981 | Stull | C06B 47/00 102/363 |
| 4,500,704 | A | | 2/1985 | Kruper | |
| 4,686,704 | A | | 8/1987 | Harris | |
| 4,709,069 | A | | 11/1987 | Harrie | |
| 4,795,810 | A | | 1/1989 | Harris | |
| 4,826,953 | A | | 5/1989 | Kuyper | |
| 4,861,909 | A | | 8/1989 | Harris | |
| 6,451,949 | B2 | | 9/2002 | Boon | |
| 6,646,100 | B2 | | 11/2003 | Hofmann | |
| 6,815,467 | B2 | * | 11/2004 | Toyota | C08G 18/0857 521/170 |
| 7,977,501 | B2 | | 7/2011 | Haider | |
| 2003/0032761 | A1 | | 2/2003 | Hofmann | |
| 2009/0203875 | A1 | * | 8/2009 | Suzuki | B01J 31/02 528/408 |
| 2009/0239964 | A1 | * | 9/2009 | Sasaki | C08G 18/4804 521/117 |
| 2012/0289732 | A1 | | 11/2012 | Gurther | |

FOREIGN PATENT DOCUMENTS

| CA | 2816641 | 6/2013 |
| EP | 600417 | 11/1993 |
| WO | 97/19972 | 6/1997 |
| WO | 03/014186 | 2/2003 |
| WO | 2008/013731 | 1/2008 |
| WO | 2010/012562 | 2/2010 |
| WO | 2011/089120 | 7/2011 |
| WO | 2012/059550 | 5/2012 |

* cited by examiner

*Primary Examiner* — Rachel Kahn

(57) ABSTRACT

Ethylene carbonate is polymerized by itself or together with another cyclic monomer such as 1,2-propylene oxide in the presence of a double metal cyanide catalyst. Most of the ethylene carbonate adds to the chain to form a terminal carbonate group, which decarboxylates to produce a hydroxyethyl group at the end of the polymer chain. The polymerization of more ethylene carbonate onto the chain end results in the formation of poly(ethyleneoxy) units. Therefore, the process provides a method for making poly (ethyleneoxy) polymers without the need to polymerize ethylene oxide. The process is useful for making polyethers that are useful as water-absorbable polymers, surfactants and as raw materials for polyurethanes. The process is also useful for increasing the primary hydroxyl content of a polyether.

10 Claims, No Drawings

PROCESS FOR MAKING POLYETHER ALCOHOLS HAVING OXYETHYLENE UNITS BY POLYMERIZATION OF ETHYLENE CARBONATE IN THE PRESENCE OF DOUBLE METAL CYANIDE CATALYSTS

This application claims benefit of U.S. Provisional Patent Application No. 61/527,299, filed 25 Aug. 2011.

This invention relates to a method for making polyether alcohols that have oxyethylene units.

Polyether alcohols are manufactured globally in large quantities. These polyether alcohols are almost always manufactured by polymerizing an oxirane compound. The polymerization is usually performed in the presence of a hydroxyl- and/or an amine-containing initiator compound. The initiator compound performs several functions. Its presence during the polymerization helps to control the molecular weight of the polyether. The choice of initiator compounds determines whether the polyether will be linear or branched, and in most cases will determine the number of terminal hydroxyl groups the polyether will have. In some cases, the initiator compound may perform some specialized function in the product. In some surfactant and emulsifier products, for example, the initiator may form the hydrophobic portion of the product. Polyether polyols initiated with amine-containing compounds are often auto-catalytic.

By far the highest volume polyethers are polymers of propylene oxide, polymers of ethylene oxide and copolymers of 1,2-propylene oxide and ethylene oxide. Ethylene oxide is used mainly for two reasons. The ethyleneoxy ($-CH_2-CH_2-O-$) units formed when ethylene oxide polymerizes are quite polar to the point of being hygroscopic, whereas the repeating units formed by polymerizing higher oxiranes such as propylene oxide are much less so. Therefore, one often incorporates ethyleneoxy units into a polyether when one wants to increase its miscibility with polar compounds such as water. The other main reason for incorporating ethyleneoxy units is to produce primary hydroxyl groups at the end of the polyether chains. The primary hydroxyl groups often are more reactive than are the secondary hydroxyl groups that are produced when 1,2-propylene oxide is polymerized. This is often beneficial when certain types of polyurethanes are produced by reaction of the polyether with a polyisocyanate compound.

Ethylene oxide is a highly toxic and highly flammable gas, and in addition is highly reactive with water among many other compounds. Because of this, transporting ethylene oxide requires special precautions that greatly increase shipping costs. To avoid difficulties and risks associated with transporting ethylene oxide, large-scale polyether production facilities are usually located at or near ethylene oxide production plants. This avoids the need to transport the ethylene oxide for long distances. However, it is not always feasible to locate polyether production close to ethylene oxide production.

Certain cyclic alkylene carbonates are known to polymerize to form polycarbonates. Although alkylene carbonates containing five-member rings are sometimes mentioned, the cyclic carbonates of choice almost always contain six-member or larger ring structures. These polycarbonates are hydroxy-terminated if the polymerization is performed in the presence of a hydroxyl compound. The polymerization can be performed using a number of different catalysts; these include, for example, various borate, stannate, arsenate and antimonate compounds (see, e.g., U.S. Pat. Nos. 4,709,069, 4,795,810, 4,861,909 and EP 600 417); alkali metal and alkaline earth metal compounds (see, e.g., U.S. Pat. No. 6,451,949); metal triflate, triflimidate, acetylacetonate or carboxylates and an alcohol (WO 2010/012562); and double metal cyanide catalysts (see, e.g., USP 2003-0032761). These polymerizations form polymers that contain carbonate groups. In some cases, a cyclic carbonate can form as a by-product of the reaction, as described in EP 600 417, necessitating a difficult removal step. Decarboxylation has been reported as a problem in at least some of these polymerizations. This problem is described in U.S. Pat. No. 6,451,949, in connection with the polymerization of tri (methylene carbonate) polymerization. This decarboxylation causes a small amount ether groups to form in the polymer chain rather than the desired carbonate groups. The decarboxylation also forms terminal allyl groups when tri (methylene carbonate) is polymerized.

Another way of producing polycarbonates is by reacting a carbon dioxide with an oxirane in the presence of a hydroxyl compound and a double metal cyanide catalyst. This approach is described, for example, in U.S. Pat. Nos. 4,500,704, 4,826,953, 7,977,501 and WO 2011/089120. The result of the polymerization is a polyethercarbonate that will contain ethyleneoxy units when ethylene oxide is selected as the oxirane compound. However, this process of course requires that a source of ethylene oxide be available.

This invention is a process for preparing a polyether containing ether-linked ethyleneoxy units, comprising polymerizing ethylene carbonate in the presence of an initiator compound having one or more oxyalkylatable groups and a double metal cyanide catalyst and in the substantial absence of ethylene oxide.

By "ether-linked", it is meant that the ethyleneoxy unit is connected on each end to the adjacent repeating units in the polymer chain via ether linkages (rather than one or more carbonate linkages) or, if at the end of the polymer chain, is connected to the polymer chain via an ether linkage while producing a terminal hydroxyl group.

As explained more below, it is believed that ethylene carbonate units that form when ethylene carbonate polymerizes onto the end of the polymer chain often decarboxylate (i.e., release a molecule of carbon dioxide) before further polymerization occurs at the site. The net result of the monomer addition and decarboxylation is the formation of a $-CH_2-CH_2-OH$ unit at the end of the polymer chain. The $-CH_2-CH_2-OH$ unit is bound to the polymer chain through an ether oxygen. Further polymerization of ethylene carbonate onto the polymer chain will upon decarboxylation form a new $-CH_2-CH_2-OH$ unit, which again is linked to the polymer chain via an ether oxygen. The polymerization of ethylene carbonate therefore forms a polymer that contains ether linkages. By homopolymerizing ethylene carbonate in this way, a polyether containing ethyleneoxy units is formed despite the fact that no ethylene oxide is present during the polymerization.

The decarboxylation does not occur all of the time, and some carbonate groups may be introduced into the polymer backbone. Surprisingly, process conditions can be manipulated to somewhat favor or disfavor the decarboxylation step and therefore produce fewer or more carbonate groups. Generally speaking, lower concentrations of carbon dioxide in the reactor head space will favor the decarboxylation reaction. Therefore, when fewer carbonate groups are wanted, measures that reduce carbon dioxide partial pressures, such as lower reactor pressure and/or periodic or continuous removal of carbon dioxide, can be used. Conversely, when more carbonate groups are wanted, higher reactor pressures and/or minimal or no removal of the carbon dioxide can be used. Therefore, the invention provides a method by which the proportion of carbonate groups in the polymer can be easily manipulated.

The —$CH_2$—$CH_2$—OH unit formed when ethylene carbonate adds onto the polymer chain and decarboxyates contains a primary hydroxyl group. Therefore, the process in some embodiments is useful for forming polyethers terminated in primary hydroxyl groups. In particular, the process is useful for introducing poly(ethyleneoxy) units onto the ends of poly(propylene oxide) polymers and copolymers of propylene oxide to produce polyols that have mainly primary hydroxyl groups, again without ethylene oxide being present during the polymerization. The ability to easily produce poly(ethyleneoxy) end-groups onto a poly(propylene oxide) polymer or a copolymer of propylene oxide using a double metal cyanide complex is a unique and very beneficial attribute of this invention. Heretofore, it has been very difficult to polymerize ethylene oxide onto poly(propylene oxide) using a double metal cyanide catalyst to form primary hydroxyl-containing poly(ethyleneoxy) end groups. Instead, it was necessary to perform the ethylene oxide polymerization with an alkali metal catalyst, which greatly increases production costs. This invention permits one to produce a poly(ethyleneoxy)-terminated poly(propylene oxide) in a single polymerization, by sequentially adding propylene oxide (or a mixture of propylene oxide with ethylene carbonate) and then ethylene carbonate onto an initiator compound, in the presence of a double metal cyanide catalyst complex.

Ethylene carbonate is polymerized or copolymerized in this invention. Ethylene carbonate is a cyclic compound having the structure:

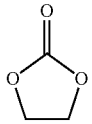

Its melting temperature as a pure compound is about 36° C. Ethylene carbonate can be prepared by reacting ethylene oxide with carbon dioxide, by polymering ethylene glycol and a dialkylcarbonate followed by depolymerization, by reaction of urea with ethylene glycol as described in WO 20091143785, or by reaction of ethylene glycol with carbon dioxide using a zinc catalyst. Ethylene carbonate is commercially available from several sources, including Huntsman Corporation, which markets suitable grades of ethylene carbonate under the Jeffsol™ and Ultrapure ™ tradenames. The ethylene carbonate preferably contains no more than 2500 ppm, more preferably no more than 1000 ppm and. still more preferably no more than 100 ppm of hydroxyl-containing species such as ethylene glycol and water.

The ethylene carbonate is provided as a previously-formed compound rather than being formed in situ by feeding both ethylene oxide and carbon dioxide into the polymerization. As discussed below, some carbon dioxide is generated as a by-product of the polymerization of ethylene carbonate and for that reason some quantity of carbon dioxide is often present during at least some stages of the polymerization. Ethylene oxide is not produced during the polymerization (except perhaps in trace quantities) and in preferably is not added to the polymerization, so the polymerization preferably occurs in the absence of ethylene oxide except perhaps for trace amounts (such as up to 1000 ppm based on total weight of monomers) as may be formed as a by-product of the polymerization reaction.

Suitable double metal cyanide catalysts are well known. Those described, for example, in any of U.S. Pat. Nos. 3,278,457, 3,278,458, 3,278,459, 3,404,109, 3,427,256, 3,427,334, 3,427,335, 5,470,813, 5,482,908, 5,536,883, 5,589,431, 5,627,120, 5,627,122, 5,639,705, 5,714,428, 5,731,407, 5,780,584, 5,783,513, 6,429,166, 6,348,565 and 6,423,662, as well as those described in WO 99/44379 and WO 01/04180, are all useful. The DMC catalyst may be crystalline or amorphous, or partially crystalline and partially amorphous.

Among the useful metal cyanide catalysts include those represented by the general formula:

$$M_b[M^1(CN)_r(X)_t]_c[M^2(X)_6]_d \cdot zL \cdot nM^3_xA_y,$$

wherein M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

z is zero or a positive number and n is a positive number indicating the relative quantities of the complexing agent and $M_xA_y$, respectively. z and n may be fractions.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

Similarly, the catalyst may contain two or more types of $M^1(CN)_r(X)_t$ groups and two or more types of $M^2(X)_6$ groups.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M and $M^3$ are more preferably $Zn^{+2}$, $Fe^{+2}$, $Co^{+2}$, $Ni^{+2}$, $La^{+3}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, and a $C_{1-4}$ carboxylate. Chloride ion is especially preferred.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, $C_{1-4}$ carbonate, oxalate, thiocyanate, isocyanate, isothiocyanate, $C_{1-4}$ carboxylate and nitrite ($NO_2^-$), and uncharged species such as CO, $H_2O$ and NO. Particularly preferred groups X are NO, $NO_2^-$ and CO.

The double metal cyanide catalyst is usually complexed with an organic complexing agent. A great number of complexing agents are potentially useful, although catalyst activity may vary according to the selection of a particular complexing agent. Examples of such complexing agents include alcohols, aldehydes, ketones, ethers, amides, nitriles, sulfides, silane-functional compounds, and the like.

Preferred complexing agents are t-butanol, 1-t-butoxy-2-propanol, polyether polyols having an equivalent weight of about 75-350 and dialkyl ethers of alkylene and polyalkylene glycols. Especially preferred complexing agents are t-butanol, 1-t-butoxy-2-propanol, polyether polyols having an equivalent weight of 125-250 and a dimethyl ether of mono-, di- or triethylene glycol. t-Butanol and glyme (1,2-dimethoxy ethane) are especially preferred.

In addition, the catalyst complex often contains a quantity of bound water. Although the amount of bound water is difficult to determine, it is believed that this amount is typically from about 0.25 to about 3 moles of water per mole of $M^1$ and $M^2$ ions.

Zinc hexacyanocobaltate-type DMC catalysts are especially preferred.

The ethylene carbonate is polymerized by heating it to a temperature of at least 120° C. in the presence of the DMC catalyst and an initiator compound. The initiator compound contains one or more oxyalkylatable groups. Among the oxyalkylatable groups are primary amino groups, secondary amino groups, thiol groups, carboxyl groups and, preferably, hydroxyl groups. The oxyalkylatable group(s) preferably are bound to aliphatic carbon atoms. DMC catalyst complexes sometimes are difficult to activate and/or perform sluggishly when the initiator compound has a low hydroxyl equivalent weight. Therefore, in some embodiments, the initiator compound is hydroxyl-containing and has a hydroxyl equivalent weight of at least 70, at least 100 or at least 200. The initiator compound may contain as few as one oxyalkylatable group per molecule, and may contain any higher number. For producing polyethers used in certain applications, such as polyurethanes, the initiator preferably has 2 to 8, especially 2 to 4 or 2 to 3, oxyalkylatable groups, preferably hydroxyl groups, per molecule and preferably has an equivalent weight per oxyalkylatable group of from 70 to 2500, especially from 500 to 2000.

Examples of useful hydroxyl-containing initiator compounds include, for example: alkanols having from 1 to 50 carbon atoms, including, for example, ethanol, 1-propanol, 1-butanol, t-butanol, 1-hexanol, 1-octanol, 1-dodcanol, 1-octadecanol, and the like; phenol and substituted phenols; alkylene glycols and polyalkylene glycols such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, and the like; other aliphatic diols such as cyclohexanedimethanol; and triols such as glycerin, trimethylol propane and trimethylolethane; triethanolamine, and other low molecular weight polyols such as erythritol and pentaerythritol.

Polyethers, especially polymers of propylene oxide, that have from 1 to 8 hydroxyl groups per molecule and a hydroxyl equivalent weight of from 70 to 2500, especially 500 to 2000, also are useful initiator compounds.

In addition, polymeric materials having one or more hydroxyl groups may serve as the initiator. Among these are, for example, polysiloxanes containing silanol or hydroxyalkyl groups; cellulose and cellulose derivatives such as hydroxypropyl cellulose, hydroxethyl cellulose or hydroxypropylmethyl cellulose; polysaccharides such as starch; poly(vinyl alcohol), polymers and copolymers of a hydroxyalkylacrylate or a hydroxyalkylmethacrylate, and the like.

Initiators that contain primary and/or secondary amine groups include, for example, ethylene diamine, cyclohexane diamine, toluene diamine, dimethylaminopropylamine, bis-(3-aminopropyl)-methylamine, methylene bis(aniline), aminoethylpiperazine, and the like.

The polymerization is performed by combining the DMC catalyst complex, initiator compound and ethylene carbonate, and heating the resulting mixture to a temperature sufficient to polymerize the ethylene carbonate. The temperature typically will be at least 120° C. A preferred temperature is from 130 to 200° C., and a more preferred temperature is from 140 to 180° C. The polymerization may proceed slowly during an initial period during which the catalyst becomes activated. This catalyst activation period may take from as little as 5 minutes to several hours. The activation of the catalyst is typically indicated by a drop in pressure and/or an increase in temperature in the reactor as the ethylene carbonate (and/or comonomer if any) begins to be consumed. Once the catalyst becomes activated, the polymerization tends to proceed rapidly.

The amount of DMC catalyst complex may range from 5 to 5000 parts by weight per million (ppm) parts by weight of the final product. A preferred amount is at least 10 ppm, up to about 500 ppm. A more preferred amount is from 25 to 200 ppm.

The polymerization preferably is performed in non-oxidizing atmosphere, except for carbon dioxide that is generated during the polymerization. The reaction can be performed, for example, under nitrogen, argon or other inert gas, and/or under a gaseous (under the polymerization conditions) comonomer such as propylene oxide.

The polymerization can be performed at subatmospheric, atmospheric or superatmospheric pressures (such as up to 50 bars (5000 kPa), preferably up to 20 bars (2000 kPa)). Pressure within the reactor may increase during the polymerization due to the production of carbon dioxide as the decarboxylation reaction proceeds. The reactor pressure can be used as a process control to produce polymers that have greater or fewer carbonate groups.

In general, higher pressures in the reactor head space disfavor the carboxylation reaction and favor the production of more carbonate groups in the polymer. Therefore, when a higher proportion of carbonate groups are wanted, the reaction can be performed at somewhat high pressures (such as greater than 1 bar (100 kPa), and/or without removing carbon dioxide from the reactor head space is it forms. It is also possible to introduce additional carbon dioxide into the reactor to promote even more carbonate group formation.

Conversely, lower proportions of carbonate groups form when the process operates at lower pressures (such as about 1 bar (100 kPa) or less), and/or when carbon dioxide is periodically removed from the reactor head space. Carbon dioxide may be vented during the polymerization one or more times or continuously to prevent excessive pressure build-up in the reactor, and/or to reduce the proportion of carbonate groups in the product.

The polymerization can be performed in various types of batch, continuous or semi-continuous reactors. Examples of semi-continuous and continuous reactors include loop reactors, pipe reactors, and continuous stirred tank reactors. In a semi-continuous or continuous process, ethylene carbonate may be introduced to the reactor intermittently or continuously. In some continuous processes, the initiator compound, ethylene carbonate (and other comonomers if used) and DMC catalyst complex are all added continuously. In a semi-continuous or continuous process, product may be withdrawn continuously or intermittently from the reactor.

Although the invention is not limited to any theory, it is believed that a molecule of ethylene carbonate can add onto a hydroxyl group on the initiator compound in either of two ways. One manner of addition forms an internal carbonate group and a terminal hydroxyl group, as illustrated in Scheme I:

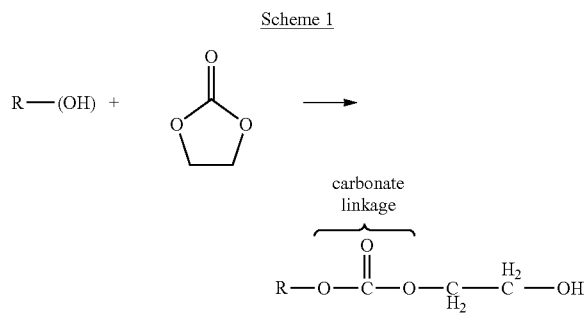

The second manner of addition forms an internal ether linkage and a terminal carbonate group. The terminal carbonate group frequently decarboxylates, the net result of the ethylene carbonate addition and subsequent decarboxylation being the addition of a —CH$_2$—CH$_2$—OH unit that is bound to the polymer chain via an ether oxygen. This sequence of reactions is illustrated in Scheme II:

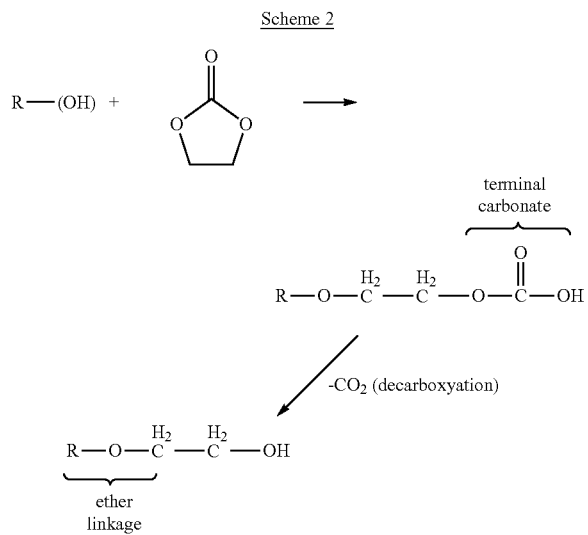

Again, a primary hydroxyl group is formed at the end of the chain. An additional molecule of ethylene carbonate can react with this hydroxyl group, in either of the foregoing ways, each time producing a new terminal —CH$_2$—CH$_2$—OH unit. p The second manner of ethylene carbonate addition has been found to predominate. Generally, about 75 to 98% of the ethylene carbonate adds in the second manner. Because most of the added ethylene carbonate groups decarboxylate, the product of the polymerization contains mainly added ether-linked ethyleneoxy units that are not meaningfully distinguishable from those formed by polymerizing ethylene oxide onto the initiator. Some proportion of carbonate linkages also may be formed when the decarboxylation reaction does not occur before another monomer unit adds onto the end of the growing polymer chain. Typically, from about 50 to 98% of the ethyleneoxy groups that form during the polymerization are ether-linked, with the remainder being linked into the polymer chain through at least one carbonate group. As discussed elsewhere herein, the proportion of carbonate linkages can be influenced somewhat by the selection of reaction conditions. In some embodiments, from 80 to 98% or from 90 to 98% of the ethyleneoxy units are ether-linked. In other embodiments, from 50 to 80% of the ethyleneoxy units are ether-linked.

Accordingly, the invention in some embodiments provides a way of forming poly(ethyleneoxy) polymers without polymerizing ethylene oxide. These poly(ethyleneoxy) polymers may contain some proportion of carbonate groups.

Ethylene carbonate copolymerizes with a variety of other cyclic monomers. Therefore, in certain embodiments, the polymerization of the ethylene carbonate is performed in the presence of one or more cyclic comonomers to form a copolymer. The other cyclic monomer may be a $C_3$ or higher cyclic ether such as, for example, 1,2-propylene oxide, 1,3-propylene oxide, 1,2-butane oxide, 2,3-butane oxide, 1,4-butane oxide, 1,2-hexane oxide, styrene oxide, and the like. The other cyclic ether may be another cyclic carbonate such as propylene carbonate, trimethylene glycol carbonate, neopentylglycol carbonate, 1,4-butanediolcarbonate, various cyclic dicarbonates, and the like. The other cyclic monomer may be a cyclic ester such as glycolide, lactide, ethylene terephthalate and the like. The copolymerization may form a random, pseudo-random or block copolymer, depending in part on the relative rates of polymerization of the ethylene carbonate and comonomer. The comonomers produce linkages that may contain, for example, carbonate groups (as in the case of cyclic carbonate comonomers), ether groups (as in the case of cyclic ether monomers) or ester groups (as in the case of cyclic ester monomers).

Ethylene carbonate reacts in the same manner during a copolymerization as it does when it is homopolymerized. It can add onto a terminal hydroxyl group in either of the two manners described before, with the addition and decarboxylation mechanism being predominant. As before, the polymerization forms a polymer containing a small amount of carbonate linkages relative to the number of ether linked ethyleneoxy units that are formed.

In a copolymerization, the ratio of ethylene carbonate to other comonomer may vary widely. In general, ethylene carbonate may constitute from 1% to 99% by weight of the combined weight of all the monomers. In some specific embodiments, ethylene carbonate constitutes 50 to 95%, or 5 to 50% of combined weight of all monomers.

A copolymerization may be a random or pseudorandom polymerization, in which ethylene carbonate and at least one other cyclic monomer are polymerized simultaneously, or a block polymerization in which ethylene carbonate and at least one other cyclic monomer are polymerized sequentially in any order.

A preferred comonomer is 1,2-propylene oxide. The copolymerization of ethylene carbonate and 1,2-propylene oxide forms a random or pseudo-random copolymer containing mainly ether linked propyleneoxy (—CH$_2$—CH(CH$_3$)—OH) units and ether linked ethyleneoxy units, often containing a small proportion of carbonate linkages. The ethylene carbonate may in general constitute from 1% to 99% of the combined weight of ethylene carbonate and 1,2-propylene oxide, the ratio being selected in each case to provide a desired ratio of propyleneoxy and ethyleneoxy units in the copolymer. For making random copolymers for polyurethane applications, the ethylene carbonate may constitute from 1 to 50% or from 5 to 35% of the combined weight of ethylene carbonate and 1,2-propylene oxide. The presence of some 1,2-propylene oxide may increase the rate at which ethylene carbonate is consumed. For this reason, some small proportion of propylene oxide (such as up to 30% or up to 20% by weight, based on combined weight of 1,2-propylene oxide and ethylene carbonate) may be copolymerized with ethylene carbonate, even, for example, when polymerizing poly(ethyleneoxy) groups onto the end of a poly(propylene oxide).

Ethylene carbonate is easily copolymerized with 1,2-propylene oxide. Ethylene carbonate is soluble in 1,2-propylene oxide, and the two monomers are therefore easily fed together into the polymerization vessel as a solution of the ethylene carbonate in 1,2-propylene oxide. Surprisingly, ethylene carbonate and 1,2-propylene oxide react little if at all with each other under the conditions of the polymerization reaction, so few if any unwanted reaction by-products are produced. When introduced together in this manner, ethylene carbonate and 1,2-propylene oxide produce a random or pseudo-random copolymer containing oxypropylene units, ether-linked oxyethylene units and typically some proportion of carbonate units in the product.

The polymerization can be continued until any desirable molecular weight is obtained. The molecular weight of the product in any specific case generally will be dictated by the application for which the product is to be used. From as few as about 1 mole to 1000 or more moles of ethylene carbonate can be polymerized per hydroxyl group on the initiator compound.

Products made in accordance with the invention are in general useful in the same applications as similar products prepared by polymerizing or copolymerizing ethylene oxide instead of ethylene carbonate. In most cases, the presence of a small proportion of carbonate groups has no significant adverse impact on the performance of the product, and in some cases may provide some benefit.

The invention is useful, for example, to produce water-soluble or water-swellable poly(ethyleneoxy) polymers that may contain some carbonate linkages, by homopolymerizing ethylene carbonate or copolymerizing ethylene carbonate with a minor amount, such as up to 25% by weight, of another cyclic monomer. These polymers are useful, for example, for absorbing aqueous wastes or to make water-absorbing products such as diapers.

The process of the invention is also useful for making certain surfactants. Such surfactants are in general characterized in having one or more hydrophobic segments and one or more poly(ethyleneoxy) segments (that may contain some carbonate linkages) produced by polymerizing ethylene carbonate in accordance with the invention. The hydrophobic portion of the surfactant may be, for example, a linear or branched alkyl group, a linear or branched alkene or alkyne, an aryl-substituted alkyl group (such as a benzyl group), a phenyl group, an alkyl-substituted phenyl group, a poly(1,2-propylene oxide), a poly(1,2-butylene oxide) group, a polysiloxane, or other hydrophobic group. The length of the poly(ethyleneoxy) blocks can be selected to provide the desired balance between the hydrophobic and hydrophilic portions of the molecule.

Such surfactants can be made in several ways in accordance with the invention. For example, ethylene carbonate can be polymerized in accordance with the invention in the presence of a hydrophobic hydroxyl containing initiator compound that, after polymerization, will correspond to the hydrophobic portion of the surfactant molecule. In such a case, the initiator compound may be, for example, a fatty alcohol, a phenol, an alkyl-substituted phenol, a poly(propylene oxide) monol or diol, a poly(butylene oxide) monol or diol, polysiloxane (containing one or more silanol and/or hydroxyl alkyl groups), and the like.

Another way of forming a surfactant is to polymerize ethylene carbonate in accordance with the invention to form a poly(ethyleneoxy) polymer having one or more terminal hydroxyl groups (and which may contain some carbonate linkages), and then to add a hydrophobic group onto one or more of the terminal hydroxyl groups. The hydrophobic group may be added by capping the hydroxyl group(s) with a hydrophobic compound that has a group that reacts with hydroxyl groups and/or by polymerizing another monomer (such as 1,2-propylene oxide, 1,2-butylene oxide and the like) onto the poly(ethyleneoxy) polymer.

Yet another way of forming a surfactant is to polymerize ethylene carbonate in accordance with the invention onto a hydroxyl-containing initiator that also contains polymerizable carbon-carbon unsaturation (such as, for example, allyl alcohol). The resulting unsaturated poly(ethyleneoxy) polymer may have a molecular weight from 100 to 5000 or more. It can then be reacted with a polyhydridosiloxane as described, for example, in U.S. Pat. No. 5,981,613. Suitable polyhydridosiloanes include those having the formula $M^*D_xD'_yM^*$, wherein each $M^*$ is independently $(CH_3)_3SiO_{1/2}$ or $H(CH_3)_2SiO_{1/2}$; D is $(CH_3)_2SiO_{1/2}$; D" is $H(CH_3)SiO_{2/2}$; x is 40-220, y is 5-40, and each R is independently a high atomic mass polyether group or a low atomic mass polyether group. The unsaturated poly(ethyleneoxy) polymer reacts at the D" units to introduce pendant poly(ethylene oxy) side-chains onto the siloxane polymer.

The invention is also useful for making polyether polyols for polyurethane production. These polyether polyols may have hydroxyl equivalent weights as low as about 50 and as much as 5000 or more, but the invention is particularly useful for producing polyether polyols having hydroxyl equivalent weights in the range of about 500 to 2000. These polyether polyols may contain 2 to 8, preferably 2 to 4 and more preferably from 2 to 3 hydroxyl groups per molecule.

The invention is especially suitable for producing two types of polyether polyols that are useful in making polyurethanes. The first type is a poly(propylene oxide) having terminal poly(ethyleneoxy) groups. This type of polyether polyol is made in accordance with the invention by selecting a poly(propylene oxide) polyol as the initiator compound. Ethylene carbonate is polymerized onto the poly(propylene oxide) initiator in the presence of the DMC catalyst complex as described above. Some 1,2-propylene oxide may be copolymerized with the ethylene carbonate. In such cases, the product may contain at least 15%, at least 30%, at least 50% and at least 70% primary hydroxyl groups. The ether-linked ethyleneoxy units added in such a polymerization may constitute, for example, from 5 to 30%, more preferably from 10 to 20% of the total weight of the product. As before, some small proportion of carbonate linkages may be present in the product. In a preferred process, the poly(propylene oxide) polyol initiator is produced by polymerizing propylene oxide in the presence of a DMC catalyst complex; in such a case, the poly(ethyleneoxy)-terminated product can be produced by first polymerizing propylene oxide in the presence of the DMC catalyst followed by the addition of ethylene carbonate to the reactor to form the terminal poly(ethyleneoxy) groups. A single batch of DMC catalyst can be used in both parts of the reaction.

The second type of polyether polyol is a random or pseudo-random copolymer containing propyleneoxy and ethyleneoxy groups, which may or may not also be terminated with poly(ethyleneoxy) groups). In such a case, a mixture of 1,2-propylene oxide and ethylene carbonate is polymerized in the presence of the initiator compound and the DMC catalyst. For many polyurethane applications, the proportions of the monomers is selected such that the product contains from about 5 to 30% by weight ethyleneoxy units and up to 95% by weight propyleneoxy units. As before, some small proportion of carbonate groups may be present in the product. It is possible to continue the polymerization in the presence of ethylene carbonate alone (or together with a small amount such as up to 25% by weight of 1,2-propylene oxide) to introduce terminal poly(ethyleneoxy) groups and increase the primary hydroxyl content of the resulting polyol.

Polyether polyols made in accordance with the invention can be reacted with organic polyisocyanates to form a variety of polyurethane and/or polyurea polymers. In general, the polyether polyols can be used in the same manner as similar polyether polyols that are made in a conventional polymerization that employs ethylene oxide instead of ethylene carbonate. The polyether polyols in general are very similar in their processing to the conventional materials and in general lead to polyurethane and/or urea polymers that have very similar properties. Therefore, conventional methods of making polyurethane and/or polyurea polymers are entirely suitable for use in connection with polyether polyols made in accordance with this invention. Among the polyurethane and/or polyurea polymers that can be so made include a variety of elastomeric and semi-elastomeric, cellular, microcellular or non-cellular polymers. Useful methods of producing such polymers are described, for example, in U.S. Pat. Nos. 4,524,102, 4,551,498, 4,876,292, 5,116,931, 5,470,935, 5,750,583, 6,437,013, US Published Patent Application No. 2003-0171445, US Published Patent Application No. 2007-0112086, WO 2008/071622 and WO 2008/021034.

The following examples are provided to illustrate the invention, but not limit the scope thereof. All parts and percentages are by weight unless otherwise indicated.

EXAMPLES 1-6 AND COMPARATIVE SAMPLE A

A polyether polyol (Comparative Sample A) having a target molecular weight of 3300 g/mol is made as follows: A 700 molecular weight poly(propylene oxide) triol is charged to a reactor. Enough of a zinc hexacyanocobaltate catalyst complex is added to provide 75 ppm of catalyst complex in the final product. 4% of propylene oxide (based on the weight of the starting triol) is added, and the reactor contents are heated to 150° C. The pressure inside the reactor is monitored until a decrease in pressure indicates that the catalyst has become activated. Activation is seen after 10-20 minutes. Once the catalyst is activated, propylene oxide is fed into the reactor over 3.5 hours. Enough propylene oxide is fed over this time to produce the target molecular weight. After the propylene oxide feed is completed, the reaction is digested at 100° C. until a constant reactor pressure is obtained, indicating that all of the propylene oxide has been consumed. The product is recovered and stripped to removal volatiles including residual monomer. Molecular weight is determined by GPC. The number average molecular weight ($M_n$) of the product is 2770, the weight average molecular weight ($M_w$) is 2900 and the polydispersity ($M_w/M_n$) is 1.05. Hydroxyl number is 51.7, consistent with a hydroxyl equivalent weight of 1085. 9% of the terminal hydroxyl groups are primary hydroxyls, which form due to some head-to-head polymerization of the propylene oxide. Unsaturation is measured to be 0.07 meq/g. Viscosity at 25° C. is 602 cSt.

Polyol Examples 1, 2 and 3 are made in the same manner, except that, after the catalyst is activated with propylene oxide, the subsequent propylene oxide feed contains 1%, 5% or 10% by weight, respectively, of ethylene carbonate. In Examples 1-3, the ethylene carbonate is pre-dissolved into the propylene oxide to form a compatible mixture in which the propylene oxide and ethylene carbonate do not react with each other. A pressure rise in the reactor is seen during the feed step, followed by an initial drop in reactor pressure due to the polymerization of the monomers. A second pressure rise is then seen during the digestion step. This latter pressure rise is indicative of carbon dioxide production and is seen to become larger as the proportion of ethylene carbonate in the feed is increased from Example 1 to Example 2 to Example 3. This confirms that ethylene oxide has polymerized and decarboxylation has occurred. The resulting products are characterized as indicated in Table 1.

TABLE 1

| Property | Comp. Sample A* | Example 1 | Example 2 | Example 3 |
|---|---|---|---|---|
| Wt. % ethylene carbonate in monomer feed | 0 | 1 | 5 | 10 |
| $M_n$, g/mol | 2770 | 2780 | 2740 | 2710 |
| $M_w$, g/mol | 2900 | 2930 | 2900 | 2870 |
| Polydispersity | 1.05 | 1.05 | 1.06 | 1.06 |
| Hydroxyl number | 51.7 | 51.6 | 51.8 | 53.6 |
| Viscosity, cSt | 602 | 615 | 611 | 630 |
| Unsaturation, meq/g | 0.007 | 0.007 | 0.004 | 0.004 |

As can be seen from the data in Table 1, the inclusion of ethylene carbonate in the propylene oxide feed has little effect on molecular weight, polydispersity, hydroxyl number and product viscosity. Unsaturation values tend to be reduced, which is beneficial.

These products are analyzed by MALDI-MS and NMR to determine whether and how the ethylene carbonate becomes incorporated into the polymer chain. The Example 1 product contains about 0.6 weight-% by weight ethyleneoxy units, which are distributed almost entirely as single ethyleneoxy units (i.e., bonded to two adjacent propyleneoxy units). This is indicative of a random or pseudorandom polymerization. Some carbonate units are present (about 0.14% of the total weight of the product), but only about 1 carbonate linkage is found for each 10 ethyleneoxy units. These results indicate that about 87% of the fed ethylene carbonate has reacted into the polymer backbone, and that about 90% of the reacted ethylene carbonate subsequently decarboxylated to form ether linked ethyleneoxy units. These results demonstrate that ethylene carbonate can substitute for ethylene oxide in this polymerization.

The results of the MALDI-MS and NMR analyses of Examples 2 and 3 are as indicated in Table 2, together with the results for Comparative Sample A and Example 1.

TABLE 2

| Property | Comp. Sample A* | Example 1 | Example 2 | Example 3 |
|---|---|---|---|---|
| Wt. % ethylene carbonate in monomer feed | 0 | 1 | 5 | 10 |
| Ethyleneoxy groups/molecule | 0.0 | 0.5 | 1.7 | 4.8 |

TABLE 2-continued

| Property | Comp. Sample A* | Example 1 | Example 2 | Example 3 |
|---|---|---|---|---|
| Carbonate groups/ molecule | 0.0 | 0.05 | 0.2 | 0.6 |
| % Ether-linked ethyleneoxy groups | 0.0 | 90 | 88 | 88 |
| Propyleneoxy groups/ molecule | 66 | 58 | 55 | 56 |
| Weight-% ethyleneoxy groups | 0.0 | 0.6 | 2.2 | 5.9 |
| Weight-% ethyleneoxy carbonyls | 0.0 | 0.14 | 0.5 | 1.3 |
| Weight-% propyleneoxy units | 97.6 | 96.6 | 94.5 | 90.2 |
| Primary OH content, % | 9.0% | 9.0% | 13.5% | 15.9% |

The MALDI-MS data indicate that in Examples 2 and 3, the ethyleneoxy units are almost all distributed as single, double or triple units (i.e., 1, 2 or 3 ethyleneoxy groups in succession), which reflects that ethylene carbonate copolymerizes with propylene oxide in a random or pseudo-random manner. Some of the ethylene carbonate is polymerized at the end of the polymer chains, as indicated by the increasing primary hydroxyl content of Examples 2 and 3. The level of ethyleneoxy units increases with the ethylene carbonate concentration in the monomer feed.

Examples 4-6 are made in the same manner as Examples 1-3, respectively, except that in each case the reactor is vented to remove accumulated carbon dioxide three hours after the start of the monomer feed and vented again at the end of the digestion. The products are analyzed as indicated with respect to Examples 1-3. Results are as indicated in Tables 3 and 4.

TABLE 3

| Property | Comp. Sample A* | Example 4 | Example 5 | Example 6 |
|---|---|---|---|---|
| Wt. % ethylene carbonate in monomer feed | 0 | 1 | 5 | 10 |
| $M_n$, g/mol | 2770 | 2801 | 2770 | 2730 |
| $M_w$, g/mol | 2900 | 2920 | 2940 | 2880 |
| Polydispersity | 1.05 | 1.04 | 1.06 | 1.05 |
| Hydroxyl number | 51.7 | 52.0 | 52.4 | 53.1 |
| Viscosity, cSt | 602 | 621 | 621 | 618 |
| Unsaturation, meq/g | 0.007 | 0.007 | 0.006 | 0.006 |

TABLE 4

| Property | Example 4 | Example 5 | Example 6 |
|---|---|---|---|
| Wt. % ethylene carbonate in monomer feed | 1 | 5 | 10 |
| Ethyleneoxy groups/molecule | 0.6 | 2.4 | 3.6 |
| Carbonate groups/molecule | 0.02 | 0.2 | 0.4 |
| % Ether-linked ethyleneoxy units | 97 | 92 | 89 |
| Propyleneoxy groups/molecule | 61 | 62 | 62 |
| Weight-% ethyleneoxy groups | 0.7 | 2.8 | 4.1 |
| Weight-% ethyleneoxy carbonyls | 0.1 | 0.5 | 0.9 |
| Weight-% propyleneoxy units | 96.7 | 94.3 | 92.6 |
| Primary OH content, % | 8.2% | 13.7% | 15.0% |

As can be seen from the data in Tables 3 and 4, the products of Examples 4-6 are similar to those of Examples 1-3, respectively. Similar to the foregoing, the MALDI-MS data indicates that in Examples 5 and 6, the ethyleneoxy units are almost all distributed as single, double or triple units. The ethyleneoxy units in Example 4 are distributed almost exclusively as single units, due to the lower concentration of ethylene oxide in the monomer feed. These results reflect that ethylene carbonate copolymerizes with propylene oxide in a random or pseudo-random manner. Decarboxylation occurs at least 90% of the time in all cases. Some of the ethylene carbonate is polymerized at the end of the polymer chains, as indicated by the increasing primary hydroxyl content of Examples 2 and 3.

The proportions of carbonate linkages in the products of Examples 4-6 are reduced, relative to the corresponding Examples 1-3, respectively. This effect is due to the reactor venting that is performed in Examples 4-6; this venting reduces reactor pressure and removed carbon dioxide from the reactor head space, each of which favors lower incorporation of carbonate linkages into the product. Still lower proportions of carbonate linkages can be produced by further reducing reactor pressure and/or more frequent venting. Conversely, higher proportions of carbonate groups can be produced by increasing the reactor pressure (relative to Examples 1-3).

Polyurethane foams are made using the polyols produced in Comparative Sample A and Examples 3, 4 and 5. The foams are made by blending the ingredients listed in Table 5 below at room temperature and pouring the resulting mixture into a box lined with a thermoplastic film.

TABLE 5

| Ingredient | Parts by Weight |
|---|---|
| Polyol[1] | 100 |
| 70% bis(dimethylaminoethyl)ether solution | 0.05 |
| 33% triethylenediamine solution[2] | 0.075-0.15 |
| Silicone surfactant | 0.7 |
| Tin octoate[2] | 0.18-0.20 |
| Water | 3.0 |
| 80/20 mixture of 2,4- and 2,6-toluene diisocyanate | To 100 index |

[1]The polyols are the products of Comparative Sample A, Example 3, Example 4 and Example 5.
[2]Catalyst amounts are varied to obtain comparable free-rise foam heights.

Density, sag factor (ratio of 65% to 25% indentation force deflection), hysteresis loss and compression force depression at 50% compression are measured. Results are as indicated in Table 6.

TABLE 6

| Property | Comp. Sample A polyol | Example 3 polyol | Example 4 polyol | Example 5 polyol |
|---|---|---|---|---|
| % ethylene carbonate in propylene oxide feed | 0 | 10 | 1 | 5 |
| Density, kg/m³ | 36.1 | 36.2 | 35.1 | 34.1 |
| Sag factor | 2.82 | 2.58 | 2.49 | 2.57 |
| Hysteresis loss, % | 71.4 | 70.4 | 70.8 | 70.8 |
| CFD (50%), kPa | 4.88 | 5.14 | 4.7 | 4.04 |

The results in Table 6 show that the polyols produced in accordance with the invention process similarly to the control. Foam properties also are comparable to the control.

EXAMPLES 7 AND 8

For Example 7, a polyol is prepared as follows: A 4000 molecular weight poly(propylene oxide) triol is prepared by adding propylene oxide onto a 700 molecular weight poly (propylene oxide) triol initiator in the presence of 150 ppm (based on product weight) of a zinc hexacyanocobaltate catalyst complex. The resulting polyol, including catalyst residues, is stored overnight under nitrogen. Then 5% of ethylene carbonate (based on the weight of the 4000 molecular weight triol) is added and the mixture is heated to 160° C. for about 3 days. During this time, a pressure increase is seen in the reactor, indicating that carbon dioxide is being generated.

For Example 8, a polyol is made in the same manner, except that the ethylene carbonate is mixed with propylene oxide in a 5:1 weight ratio, and the reaction is stopped after only 9 hours. Again, a pressure increase indicative of carbon dioxide is seen during the polymerization.

The products of Examples 7 and 8 are analyzed as described in the previous examples. Results are as indicated in Table 7 below.

TABLE 7

| Property | Example 7 | Example 8 |
| --- | --- | --- |
| $M_w$ | 4261 | 4371 |
| Hydroxyl number | 39.5 | 38.5 |
| Viscosity, cSt | 562 | 794 |
| Unsaturation, meq/g | 0.013 | 0.018 |
| % ethylene carbonate reacted | 14.9 | 22.7 |
| % decarboxylation | 95.4 | 92.7 |
| Primary hydroxyl groups, % | 9.4 | 10.3 |

These results demonstrate that poly(ethylene oxy) end-caps can be introduced onto a polyol by polymerizing ethylene carbonate in accordance with the invention. As before, a large percentage of the ethylene carbonate groups that polymerize onto the end of the polymer chain decarboxylate, so that only a small proportion of carbonate linkages are introduced into the molecule. The results from Example 8 suggest that ethylene carbonate polymerization proceeds more efficiently if the ethylene carbonate is copolymerized with a small amount of propylene oxide.

What is claimed is:

1. A process for preparing a polyether containing ether-linked ethyleneoxy units, comprising copolymerizing a mixture of 5-35 weight-% ethylene carbonate and 65-95 weight-% 1,2-propylene oxide, based on the combined weight of the ethylene carbonate and 1,2-propylene oxide, wherein the ethylene carbonate is dissolved in the 1,2-propylene oxide prior to being polymerized, in the presence of an initiator compound having one or more oxyalkylatable groups and a double metal cyanide catalyst and in the substantial absence of ethylene oxide, wherein 80 to 98% of the ethyleneoxy units are ether-linked.

2. The process of claim 1 wherein the oxyalkylatable groups are hydroxyl, primary amino or secondary amino groups, or a mixture of any two or more of such groups.

3. The process of claim 2 wherein the oxyalkylatable groups are hydroxyl groups.

4. The process of claim 3 wherein the initiator contains from 2 to 8 hydroxyl groups per molecule and has a hydroxyl equivalent weight of from 70 to 2500.

5. The process of claim 3 wherein the initiator is a polyether that has a hydroxyl equivalent weight of from 500 to 2000.

6. The process of claim 1 wherein carbon dioxide is removed at least once during the polymerization.

7. The process of claim 1, wherein the product contains carbonate groups.

8. The process of claim 1, wherein the product contains terminal poly(ethyleneoxy) groups.

9. The process of claim 8, which contains terminal primary hydroxyl groups.

10. The process of claim 1, further comprising continuing the polymerization in the presence of ethylene carbonate alone or together with up to 25% by weight of 1,2-propylene oxide to introduce terminal poly(ethyleneoxy) groups and increase the primary hydroxyl content of the polyether.

* * * * *